United States Patent Office 3,559,026
Patented Jan. 26, 1971

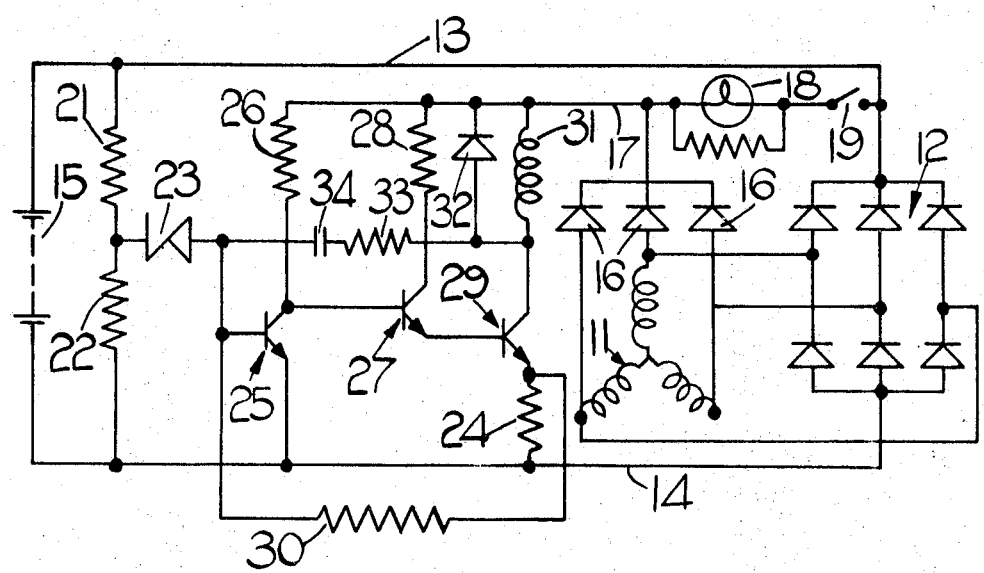

3,559,026
VOLTAGE REGULATOR UTILIZING A NEGATIVE FEEDBACK FOR STABILIZING VOLTAGE OVER A DEFINED BAND
Roger William Nolan, Redditch, Lancelot Phoenix, Birmingham, David Wiley, Walsall, and Malcolm Williams, Solihull, England, assignors to Joseph Lucas (Industries) Limited, Birmingham, England
Filed Feb. 6, 1968, Ser. No. 703,449
Claims priority, application Great Britain, Feb. 14, 1967, 7,010/67; May 10, 1967, 21,746/67
Int. Cl. H02j 7/14
U.S. Cl. 320—39               5 Claims

ABSTRACT OF THE DISCLOSURE

In a voltage regulator of the kind including a power transistor in series with the field winding of a generator, and a control transistor sensitive to battery voltage for determining the current flow through the control transistor, negative feedback is provided from the power transistor to control transistor to stabilise the overall gain of the regulator, so overcoming problems experienced on installation of the regulator in vehicles.

---

This invention relates to voltage regulators for use in battery charging systems on road vehicles, of the kind including a power transistor which in use is connected in series with a field winding of the vehicle generator, and means for controlling the current flowing through said power transistor in accordance with the voltage of the battery, said means including a control transistor which when conductive reduces the base current of the main transistor.

Such regulators fall into two categories, the amplifier type and the switching type. In each case, the power transistor is fully conductive below a predetermined battery voltage, but at the predetermined battery voltage the control transistor conducts. Moreover, in both cases there is a second and higher predetermined battery voltage at which the control transistor is fully on and the power transistor is off. In the amplifier type regulator, the circuit operates between these predetermined voltages in an amplifying mode, with the control transistor gradually increasing its current and the power transistor gradually reducing its current. In the switching type regulator, positive feedback is provided so that between said predetermined voltages the transistors oscillate between one state with the control transistor fully on and the power transistor off, and a second state with the control transistor off and the power transistor fully on. Between the predetermined voltages, the mark-space ratio varies so that the mean current flow in the field winding reduces with increasing voltage.

Experiments have shown that both types of regulator are prone to erratic operation in certain circumstances, and it has now been found that the erratic operation is a result of the resistance of the leads connecting the regulator in the charging system. Considering the amplifier type, it is found that from time to time a Schmidt trigger action occurs between the transistors, so that the power transistor assumes either an on or an off state when it should be acting as an amplifier. Similarly, the Schmidt trigger action can cause the power transistor in a switching type regulator to remain on or off when it should be oscillating. In both cases, the regulator ceases to regulate between the predetermined voltages referred to earlier, and instead the Schmidt trigger action results in oscillation of the regulated voltages between values which are sufficiently far apart to cause lamps on a vehicle to flicker.

It has been found that for a given difference between the predetermined voltages referred to earlier, there is a maximum permissible value of lead resistance above which the Schmidt trigger action will occur. For this reason, a regulator which has been designed without knowledge of the possibility of Schmidt trigger action may operate satisfactorily in a certain make of road vehicle, but the same regulator may prove erratic in operation when used in a different vehicle, because its position in the new vehicle entails the use of longer connecting leads, thus increasing the resistance to a value where the Schmidt trigger operation takes place. Worse still, it is possible that with a vehicle wiring harness of given resistance, some regulators may operate satisfactorily while other regulators of the same type may be unstable. The reason for this is that the difference between the predetermined voltages referred to earlier is dependent on the gains of the transistors, which vary. Thus for a fixed value of lead resistance, the satisfactory operation of a regulator may depend on the gains of the transistors.

The object of the invention is to provide a regulator which will operate satisfactorily provided the lead resistance is below a predetermined value which can be calculated. To this end, a regulator of the kind specified is provided with negative feedback to stabilise the overall gain of the regulator. In this way, the difference between the two predetermined voltages referred to earlier is accurately determined, and remains substantially constant.

The accompanying drawing is a circuit diagram illustrating one example of the invention as applied to a switching type regulator.

Referring to the drawing, an alternator 11 supplies power to a full wave rectifier 12 to positive and negative supply lines 13, 14 between which the battery 15 of a road vehicle is connected. The alternator also supplies power through three additional diodes 16 to a positive supply line 17, which in use will be at substantially the same potential as the positive line 13. The lines 17, 13 are interconnected by a warning lamp 18 in series with the ignition switch 19 of the vehicle, a resistor 20 being connected across the lamp 18. The ignition controlled loads of the vehicle are connected across the battery, in series with the switch 19.

Connected across the lines 13, 14 are a pair of resistors 21, 22 in series, the values of these resistors being such that the current drain when the vehicle is not in use is negligible. A point intermediate the resistors 21, 22 is connected to the cathode of a Zener diode 23, the anode of which is connected to the base of an n-p-n transistor 25, the emitter of which is connected to the line 14. The collector of the transistor 25 is connected to the line 17 through a resistor 26, and is further connected to the base of an n-p-n transistor 27, the collector of which is connected to the line 17 through a resistor 28, and the emitter of which is connected to the base of an n-p-n power transistor 29. The transistor 29 has its emitter connected to the line 14 through a resistor 24, and its collector connected to the line 17 through the field winding 31 of the alternator, a diode 32 being connected in parallel with the winding 31. The collector of the tranisstor 29 is also connected to the base of the transistor 25 through a positive feedback path including a resistor 33 and a capacitor 34 in series.

A negative feedback path is also provided by virtue of a resistor 30 connected between the emitter of the transistor 29 and the base of the transistor 25.

In operation, ignoring for the moment the resistor 30, when the ignition switch 19 is closed down, the transistors 27, 29 are turned on by current flow through the warning lamp 18, which is illuminated. Full field current now flows in the winding 31. As soon as the alternator 11 produces an output, the potential of the line 17 rises to that of the line 13, and so the warning lamp 18 is extinguished, although the transistors 27, 29 are still maintained conductive by power supplied through the diodes 16.

When a predetermined voltage is attained, the Zener diode 23 conducts and the resultant base-emitter current in the transistor 25 causes collector current to flow in the transistor 25. When this collector current reaches a predetermined value, sufficient current flowing through the resistor 26 is diverted through the transistor 25 to cause a switching action to commence. The switching action causes the transistor 25 to become fully conductive and the transistors 27, 29 to be turned off so that no field current flows. The positive feedback path through the resistors 33 and 34 ensures that the circuit switches rapidly from one state with the transistor 25 and the transistors 27, 29 off, and a second state in which the transistors 27, 29 are on and the transistor 25 is off. The mark space ratio is determined by the current flowing through the Zener diode 23, which in turn is dependent upon the voltage of the battery, and the arrangement is such that the mean current flow in the winding 31 maintains the battery voltage at a predetermined value.

As previously explained, the difference between the two predetermined voltages varies with the gain of the transistors, and the negative feedback path through the resistor 30 is incorporated to maintain the difference constant, so that the maximum permissible value of line resistance can be accurately determined for the regulator. Assuming that the Zener diode 23 has broken down, then when the transistor 29 is not conducting, current can flow through the resistor 21, the Zener diode 23 the resistor 30 and the resistor 24 to the line 14. As the transistor 29 starts to conduct, the voltage at its emitter rises towards the positive line, and so the current flow through the resistor 30 is reduced. Consequently, the voltage at the junction of resistors 21, 22 tends to rise, and this rise in voltage tends to reduce the field current. It can readily be shown that with this arrangement, the maximum allowable lead resistance is proportional to the product of the values of resistors 24, 21 divided by the value of the resistor 30.

Although not primarily intended for this purpose, the inclusion of the negative feedback resistor 30 protects the system against failure of the transistor 29 in the event that the field winding 31 should become short-circuited. In these circumstances, excessive field current starts to flow, and the voltage at the emitter of the transistor 29 rises until it reaches a value at which it can turn the transistor 25 on, thereby diverting base current from the transistor 29, a balance being reached at which the current flow through the transistor 29 is acceptable. The transistors 25, 29 are preferably positioned in close thermal contact, so that the heat dissipation in the transistor 29 raises the temperature of the transistor 25, thereby lowering its base-emitter voltage, which in turn tends to cause more current to flow in the transistor 25, so that less current flows in the transistor 29. The circuit is so arranged that a balance point is reached at which the dissipation of heat in the transistor 29 is acceptable.

If the battery temperature was constant, the circuit would be quite satisfactory as described above. However, in practice the temperature of the battery inevitably varies, and so it is necessary to provide temperature compensation. Such compensation is normally accomplished by utilising a thermistor connected in parallel with the resistor 21, the arrangement being such that a falling regulating voltage is obtained as the temperature increases. If the thermistor is omitted, there is no temperature compensation, and the regulator is unsatisfactory. In FIG. 1, temperature compensation is obtained without a thermistor provided the values of the various components are correctly chosen. The transistor 25 has a characteristic such that for a predetermined collector current, the base-emitter voltage required to sustain the collector current decreases with temperature. Since regulation commences at a predetermined collector current, it can be arranged that the output voltage of the alternator is reduced as the temperature of the transistor 25 increases, and so regulation can be obtained provided that the transistor 25 experiences temperatures which are sufficiently closely related to the battery temperature. It must be noted that in order for this compensation to be effective, the value of the resistor 30, which in addition to its feedback function determines the base-emitter voltage of the transistor 25, must be carefully chosen in relation to the value of the resistor 21. It is found that a satisfactory value for the resistor 30 can be chosen so that the resistor performs its dual function in a satisfactory manner.

Although of course the circuit values will depend on the particular application, one suitable set of values for a 12-volt system is given below.

Resistor 21—1000 ohms
Resistor 22—3000 ohms
Resistor 24—.05 ohms
Resistor 26—1000 ohms
Resistor 28—80 ohms
Resistor 30—540 ohms
Resistor 33—1000 ohms
Zener 23—8 volts breakdown
Transistors 25, 27—Lucas type DT16
Transistor 29—Lucas type DT32
Capacitor 34—10,000 picofarads In a modification, the emitter of the transistor 27 is also connected to the line 14 through a resistor, and the emitter of the transistor 29 is connected directly to the line 14. The feedback resistor 30 is connected to the base of the transistor 29 instead of the emitter. With this arrangement, the feedback is controlled by the base-emitter characteristics of the transistor 29, so that the emitter resistor of the transistor 27 is not critical, and can in some applications be omitted.

A resistor 32 may be provided between the base of the transistor 27 and the collector of the transistor 25, this resistor serving in conjunction with the transistor 25 to reduce ratio interference. The capacitor could be between the base and collector of the transistor 27, or capacitors could be employed between the bases and collectors of both transistors 25, 27.

The drawing shows a switching type regulator, the invention can readily be applied to an amplifier type regulator by omitting the components 33, 34 and arranging the circuit values so that the transistor 29 acts as an amplifier as explained earlier. Nor is this principle limited to regulators employing n-p-n transistors. This principle can be applied to regulators manufactured from p-n-p transistors and combinations of n-p-n and p-n-p transistor. Numerous other modifications could be made because there are numerous types of voltage regulator using a control transistor and a power transistor, and all would benefit from the incorporation of negative feedback in accordance with the invention, irrespective of how the negative feedback is achieved.

Having thus described our invention what we claim as new and desire to secure by Letters Patent is:

1. A voltage regulator for use with the vehicle generator in a battery charging system on a road vehicle comprising:

power transistor means including a power transistor connected in series with a field winding of the vehicle generator;

and means for controlling the current flowing through said power transistor means in accordance with the voltage of the battery, said controlling means including control transistor means to reduce the base current of said power transistor when said control transistor means is conducting, including a control transistor connected to said power transistor means, and negative feedback means relative to said power transistor means to oppose increasing conduction of said control transistor means and to stabilize the overall gain of the regulator connected in an unbypassed electrical path between said power transistor means and the base of said control transistor, said negative feedback means including a resistor connected between an emitter of said power transistor and the base of said control transistor.

2. A regulator as claimed in claim 1, further characterized by said power transistor means including a third transistor connected to the base of said power transistor between said control transistor and said power transistor.

3. A regulator as claimed in claim 1, further characterized by said resistor in said negative feedback means having a value so chosen in relation to the characteristics of said control transistor and the other circuit values that the battery voltage at which regulation commences varies with temperature in a predetermined manner.

4. A regulator as claimed in claim 1, further characterized by positive feedback means to allow a switching mode for said power transistor means, connected between said power transistor and said control transistor.

5. A regulator as claimed in claim 1, in which said power transistor and said control transistor are located in close thermal contact.

References Cited

UNITED STATES PATENTS

| | | | |
|---|---|---|---|
| 2,809,301 | 10/1957 | Short | 322—28X |
| 3,178,612 | 4/1965 | Kerr | 323—22X |
| 3,201,681 | 8/1965 | Van Wilgen et al. | 320—68X |
| 3,332,003 | 7/1967 | Hetzler | 322—73X |
| 3,366,842 | 1/1968 | Lund | 322—28X |

J D MILLER, Primary Examiner

J. M. GUNTHER, Assistant Examiner

U.S. Cl. X.R.

320—61, 68; 322—28, 73